US012624800B2

(12) United States Patent
Deng et al.

(10) Patent No.: US 12,624,800 B2
(45) Date of Patent: May 12, 2026

(54) MULTI-POSITION CONTROLLED AIRWAY VALVE, REFILLING DEVICE AND REFILLING SYSTEM

(71) Applicant: Chant Heat Energy Science & Technology (Zhongshan) Co., Ltd., Zhongshan (CN)

(72) Inventors: Xianmin Deng, Zhongshan (CN); Guoquan Chen, Zhongshan (CN); Weizhao Guo, Zhongshan (CN); Guangzhi Mai, Zhongshan (CN)

(73) Assignee: Chant Heat Energy Science & Technology (Zhongshan) Co., Ltd., Zhongshan (CN)

( * ) Notice: Subject to any disclaimer, the term of this patent is extended or adjusted under 35 U.S.C. 154(b) by 154 days.

(21) Appl. No.: 18/761,363

(22) Filed: Jul. 2, 2024

(65) Prior Publication Data

US 2025/0320967 A1 Oct. 16, 2025

(30) Foreign Application Priority Data

Apr. 10, 2024 (CN) .......................... 202410431849.8
Apr. 10, 2024 (CN) .......................... 202420739270.3

(51) Int. Cl.
| | |
|---|---|
| *F17C 13/00* | (2006.01) |
| *F16K 1/32* | (2006.01) |
| *F16K 17/02* | (2006.01) |
| *F16K 31/60* | (2006.01) |

(52) U.S. Cl.
CPC .............. *F17C 13/002* (2013.01); *F16K 1/32* (2013.01); *F16K 17/02* (2013.01); *F16K 31/602* (2013.01); *F17C 2205/0332* (2013.01)

(58) Field of Classification Search
CPC .. F17C 13/002; F17C 2205/0332; F16K 1/32; F16K 17/02; F16K 31/602

USPC ........................................................... 141/18
See application file for complete search history.

(56) References Cited

U.S. PATENT DOCUMENTS

| | | | | |
|---|---|---|---|---|
| 2014/0326328 A1* | 11/2014 | Newman | ................. | F17C 13/04 |
| | | | | 137/199 |
| 2015/0041001 A1* | 2/2015 | Li | .......................... | F16K 17/168 |
| | | | | 137/557 |

FOREIGN PATENT DOCUMENTS

| | | | | |
|---|---|---|---|---|
| CN | 106481849 A | * | 3/2017 | ............ F17C 13/002 |
| CN | 207716079 U | | 8/2018 | |

OTHER PUBLICATIONS

CN 106481849 A—English Translation (Year: 2017).*

* cited by examiner

*Primary Examiner* — Christopher M Afful

(57) ABSTRACT

Disclosed in the present disclosure is a multi-position controlled airway valve, including a venting control member; a valve body, provided with a fluid channel and a venting channel, in which the venting control member is provided on the venting channel; a valve core assembly, mounted in the fluid channel, controlling the fluid channel to switch between a connected state and a sealed state, wherein the valve core assembly in a filling mode controls the fluid channel to be in the connected state and abuts against the venting control member so as to keep the venting channel to be in a ventilated state. Disclosed is also a refilling device applied with the multi-position controlled airway valve and a refilling system applied with the refilling device, so as to achieve the objective of removing air and residual gases promptly when refilling with new fuels.

20 Claims, 13 Drawing Sheets

MULTI-POSITION CONTROLLED AIRWAY VALVE, REFILLING DEVICE AND REFILLING SYSTEM

CROSS REFERENCE TO RELATED APPLICATIONS

The present application claims the benefit of Chinese Patent Application Nos. 202410431849.8 and 202420739270.3 filed on Apr. 10, 2024. All the above are hereby incorporated by reference in their entirety.

FIELD

The present disclosure relates to the field of valves and, particularly, to a multi-position controlled airway valve, a refilling device and a refilling system.

BACKGROUND

In the existing filling technology, in order to ensure the safety of the steel cylinder in the process of filling and using, please refer to a steel cylinder for filling gases of Grant Publication No. CN207716079U, disclosed on Aug. 10, 2018. Generally, a safety needle valve (or safety valve) is additionally mounted on the existing cylinder, so that the gas inside the cylinder is discharged through the safety needle valve to balance the air pressure inside and outside the cylinder in case the pressure inside the cylinder is excessively high, so as to avoid the risk of blowing up of the existing cylinder.

However, it is inevitable that existing cylinders are filled with air during refilling. In addition, it is inevitable that unused gas remains in the existing cylinders, so that it is likely to lead to the problem of impurity of the fuel due to the mixing of other gases if the air and the residual gas in the existing cylinders are not eliminated when new fuel is added to an interior of the existing cylinders. The safety needle valve of the existing cylinder is only used to ensure the safety of the existing cylinder. When the gas inside the existing cylinder is discharged to the outside under excessive pressure, the discharged gas contains a large amount of freshly filled fuel, which not only causes serious pollution to the environment, but also poses a safety hazard.

SUMMARY

In order to overcome at least one of the aforementioned deficiencies described in the prior art, the present disclosure provides a multi-position controlled airway valve, a refilling device and a refilling system to achieve the purpose of promptly removing air and residual gases in the case of repeated refilling of new fuel.

The technical solutions adopted by the present disclosure to solve the problems are as follows.

A multi-position controlled airway valve, including:

a venting control member;

a valve body, provided with a fluid channel and a venting channel, wherein the venting control member is provided on the venting channel;

a valve core assembly, mounted in the fluid channel, controlling the fluid channel to switch between a connected state and a sealed state, wherein the valve core assembly in an inflation state controls the fluid channel to be in the connected state and abuts against the venting control member so as to keep the venting channel to be in a ventilated state.

In some embodiments of the present disclosure, the valve core assembly is provided with a first push stroke and a second push stroke, the first push stroke is a stroke where a movable ejector pin of the valve core assembly moves to a side proximal to the venting control member, the first push stroke is used to allow the fluid channel to be in the connected state, the second push stroke is a stroke where the movable ejector pin moves in an extension direction of the first push stroke to abut against and open the venting control member, and the second push stroke is used to allow the venting channel to be in the ventilated state when the fluid channel is kept to be in the ventilated state.

In some embodiments of the present disclosure, the venting control member includes a movable sealing member and a valve holder assembly, the movable sealing member is reciprocally slidable to fit within the valve holder assembly, the valve core assembly abuts against the movable sealing member in the filling mode to communicate the valve holder assembly with the venting channel, and the valve holder assembly is provided on an end of the venting channel and detachably connected to the valve body.

In some embodiments of the present disclosure, the valve holder assembly includes a venting holder and a venting reset member, a venting valve shaft is inserted in the venting holder, the venting valve shaft is the movable sealing member, the venting holder is fixedly connected to an end of the venting channel, and the venting reset member is used to automatically reset the venting valve shaft after withdrawal of a force.

In some embodiments of the present disclosure, the valve holder assembly includes a venting connecting holder, an airtight core body inserted within the venting connecting holder, a core spring reset member configured within the airtight core body, the airtight core body is mounted with a movable core shaft, the movable core shaft is the movable sealing member, the core spring reset member is sheathed to the movable core shaft so that the movable core shaft automatically resets after withdrawal of a force.

In some embodiments of the present disclosure, a communicating intersection between the fluid channel and the venting channel is configured with a seal ring, and the movable sealing member is inserted in the seal ring.

In some embodiments of the present disclosure, the multi-position controlled airway valve further includes a multi-position switch mounted on the valve body, and the multi-position switch is provided with a first position mode, a second position mode, and a third position mode, in which, in the first position mode, a switch plunger member of the multi-position switch is separated from the valve core assembly, and the fluid channel is in the sealed state, in which, in the second position mode, the switch plunger member of the multi-position switch abuts against the valve core assembly to allow the fluid channel to be in the connected state, in which, in the third position mode, the switch plunger member of the multi-position switch abuts against the valve core assembly to allow the venting channel to be in the ventilated state and keep the fluid channel to be in the connected state.

In some embodiments of the present disclosure, the multi-position switch comprises a switch toggle member and a switch connecting holder, the switch connecting holder is provided with a switch air-guide chamber in communication with the fluid channel, the switch toggle member is hinged to the switch plunger member, and the switch plunger member is slidably provided in the switch air-guide chamber.

In some embodiments of the present disclosure, the switch toggle member is configured with a first action contact end, a second action contact end, and a third action contact end;

the multi-position switch is in the first position mode when the switch toggle member moves and is switched to the first action contact end; or the multi-position switch is in the second position mode when the switch toggle member moves and is switched to the second action contact end; or the multi-position switch is in the third position mode when the switch toggle member moves and is switched to the third action contact end.

In some embodiments of the present disclosure, the multi-position controlled airway valve further includes an over-temperature protection member provided in the fluid channel, and the valve core assembly controls the fluid channel to be in the sealed state when the over-temperature protection member is melted or thermally deformed.

In some embodiments of the present disclosure, the over-temperature protection member is sheathed to an end of the movable ejector pin of the valve core assembly.

In some embodiments of the present disclosure, the multi-position controlled airway valve further includes a pressure relief adjusting member, the valve body is further provided with a pressure relief channel, the pressure relief adjusting member is mounted on the pressure relief channel, the pressure relief adjusting member is used to direct and remove fluid fuel and heat along the pressure relief channel in high-temperature conditions.

In some embodiments of the present disclosure, the pressure relief adjusting member includes a heat dissipation reset member, a venting fixing holder provided with a heat dissipation opening, and a valve member for sealing the heat dissipation opening, both ends of the heat dissipation reset member abut against the valve member and the valve body, and the heat dissipation reset member, the venting fixing holder, and the valve member are all mounted within the pressure relief channel.

In some embodiments of the present disclosure, the pressure relief adjusting member includes a pressure relief reset member, a pressure relief valve shaft, and a pressure relief connecting holder, both ends of the pressure relief reset member are abutted against the pressure relief valve shaft and the pressure relief connecting holder respectively, an end of the pressure relief channel is provided with a pressure relief chamber in communication with an exterior of the valve body, the pressure relief chamber is provided with a through-opening in communication with the pressure relief channel, the pressure relief connecting holder is fixedly connected to the pressure relief chamber, and the pressure relief reset member is used to reset the pressure relief valve shaft to seal the through-opening.

In some embodiments of the present disclosure, the pressure relief valve shaft is provided with a rotatable handle, the pressure relief connecting holder is provided with a guiding protrusion, and the rotatable handle is rotated to allow the rotatable handle to slide in contact with a guiding surface of the guiding protrusion and also move in a central axis direction of itself.

In some embodiments of the present disclosure, the pressure relief channel is in communication with the fluid channel, or the pressure relief channel is in communication with the venting channel.

In some embodiments of the present disclosure, the fluid channel comprises a fluid main channel, a fluid output tube, and a fluid connection tube;

the fluid main channel is in communication with the fluid output tube through the fluid connection tube, and the fluid main channel extends in a central axis direction of the valve body; and/or the fluid main channel is in communication with the fluid output tube directly, and fluid output tube extends inclined in a central axis direction of the valve body.

In some embodiments of the present disclosure, the venting channel comprises a venting main channel, a venting output tube, and a venting input tube;

the venting input tube is in communication with the venting output tube through the venting main channel, and the venting main channel extends in parallel to a central axis direction of the valve body; and/or the venting channel extends inclined in a central axis direction of the valve body.

Disclosed in the present disclosure is further a refilling device, including:

the aforementioned multi-position controlled airway valve;

a storage vessel, the multi-position controlled airway valve being fixedly connected to the storage vessel.

Disclosed in the present disclosure is further a refilling system, including the aforementioned refilling device.

In summary, the multi-position controlled airway valve, the refilling device and the refilling system provided in the present disclosure provide following technical effects:

Through the cooperation of the venting control member and the valve core assembly, the multi-position controlled airway valve switches the use status automatically when connecting to different connectors (such as the pressure-reducing valve of a filling spray gun or energy equipment), eliminating the necessity of manual switching, effectively avoiding the problem of impurity of the fuel when using it due to the omission of the step of discharging the air and the residual gas, thereby achieving the purpose of removing the air and the residual gas promptly and automatically.

In addition, it not only simplifies the structure of the existing cylinders, but is also conducive to improving the strength and stability of the cylinders, thereby improving the safety of the use of cylinders, and avoiding the safety hazards of multiple valves installed in the cylinders which may lead to gas leakage.

Labels: 1 multi-position controlled airway valve; 11 venting control member; 111*a* venting valve shaft; 112*a* venting holder; 113*a* closing part; 114*a* venting reset member; 115*a* reset protrusion; 111*b* airtight core; 1111 movable core shaft; 1112 core spring reset member; 1113 airtight core body; 1114 core-body internal channel; 1115 core holder sealing member; 112*b* venting connecting holder; 113*b* air guiding channel; 12 valve body; 121 fluid channel; 122 venting channel; 123 fluid input; 124 fluid output; 125 venting output; 126 venting input; 127 pressure relief channel; 13 valve core assembly; 131 valve core piston body; 132 movable ejector pin; 133 ejector pin elastic member; 134 piston-body internal channel; 135 shelter part; 2 filling spray gun; 21 gun needle plunger; 22 gun body; 23 trigger; 3 transporting pipeline; 4 storage vessel; 41 vessel opening end; 5 valve core plunger; 6 over-temperature protection member; 7 pressure relief adjusting member; 71*a* heat dissipation reset member; 72*a* venting fixing holder; 73*a* valve member; 71*b* pressure relief reset member; 72*b* pressure relief connecting holder; 73*b* pressure relief valve shaft; 74 pressure relief chamber; 75 through-opening; 76 rotatable handle; 77 guiding protrusion; 78 guiding surface; 79 pressure relief hole; 70 anti-detachment limiting part; 8 sealing ring; 9 multi-position switch; 91 switch plunger member; 92 switch toggle member; 921 first action contact end; 922 second action contact end; 923 third action contact end; 93 switch connecting holder; 94 switch air-guide chamber; 95 switch external opening; 96 switch sealing member; 97 sealing part.

DETAILED DESCRIPTION OF THE EMBODIMENTS

For a better understanding and implementation, the technical solutions in the embodiments of the present disclosure are clearly and completely described below in conjunction with the attached drawings of the present disclosure.

In the description of the present disclosure, it is to be noted that the terms "up", "down", "front", "back", "left", "right", "vertical", "horizontal", "top", "bottom", "inside", "outside" and other orientation or position relationships are based on the orientation or position relationships shown in the attached drawings. It is only intended to facilitate description of the present disclosure and simplify description, but not to indicate or imply that the referred device or element has a specific orientation, or is constructed and operated in a specific orientation. Therefore, they should not be construed as a limitation of the present disclosure.

Unless otherwise defined, all terms including technical and scientific terms used herein have the same meaning as commonly understood by those skilled in the art to which the present disclosure belongs. The terms used herein in the specification of the present disclosure are used only to describe specific embodiments and are not intended as a limitation of the disclosure.

Embodiment 1

Figure 1:
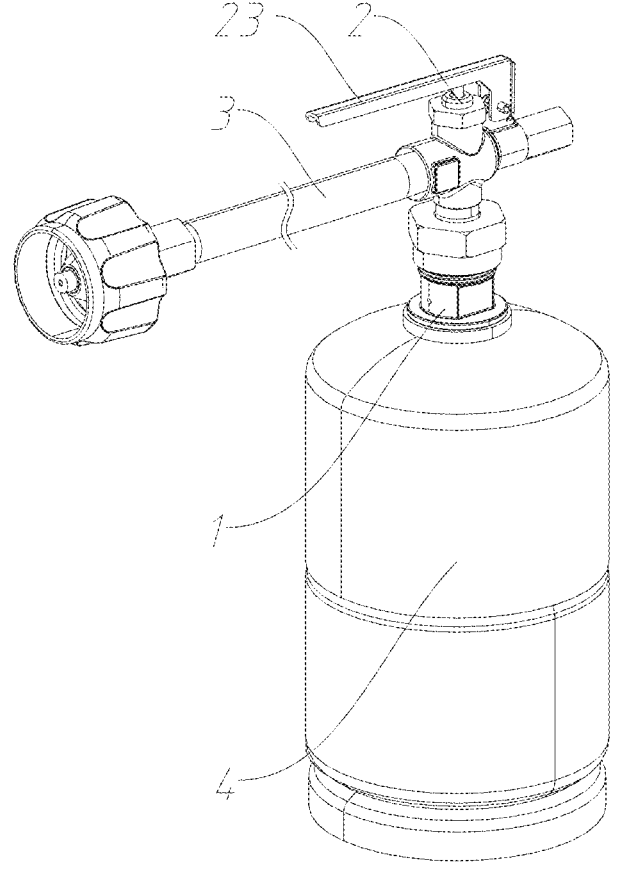
FIG. 1 is a partial structural diagram of a refilling system of the present disclosure.

Specifically, please refer to FIG. 1. Disclosed in the present disclosure is a filling system, including a filling device and a gas-liquid supply device, in which the gas-liquid supply device may optionally be a supply device for a liquid fuel or a gas fuel, and may optionally be a storage tank for the liquid fuel or the gas fuel. The gas-liquid supply device is connected to the refilling device by means of a filling connector, which allows the gas-liquid supply device to transport and fill liquid fuel or gas fuel (hereinafter referred to as fluid fuel) to the refilling device for storage.

It should be supplemented that, as shown in FIG. 1, the filling connector described above includes a filling spray gun 2, and a transporting pipeline 3 connected to the filling spray gun 2, with an opposite end of the transporting pipeline 3 being connected to an output end of the gas-liquid supply device. The filling spray gun 2 belongs to a mature existing technology in the art, which includes a gun needle plunger 21, a gun body 22 and a trigger 23, the trigger 23 being hinged to the gun body 22, and the trigger 23 being in transmission connection with the gun needle plunger 21. The transporting pipeline 3 is connected to the filling spray gun 2, so that the fluid fuel will be transported through the transporting pipeline 3 to the gun body 22 and output from the gun nozzle of the gun body 22 to the refilling device.

In the present embodiment, referring specifically to FIG. 1, the refilling device includes a storage vessel 4 that may be made of any material, such as a metallic material, a composite material, or any other material suitable for making bottles and tanks. In addition, the storage vessel 4 may be manufactured to the desired specifications and conform to applicable design standards for refillability.

As the core implementation of the present embodiment, please refer to FIGS. 1 to 4 for details. The refilling device further includes a multi-position controlled airway valve 1 fixedly connected to the storage vessel 4, in which the multi-position controlled airway valve 1 includes a venting control member 11, a valve body 12, and a valve core assembly 13. The valve body 12 is provided with a fluid channel 121 and a venting channel 122, in which the fluid channel 121 is used to transport fluid fuel, and the venting channel 122 is used to remove air and residual gas transported into the storage vessel 4. The fluid channel 121 and the venting channel 122 are provided independently, so that the transport of fluid fuel does not interfere with the transport of air and residual gas, thereby avoiding wastage of part of the fluid fuel flow to the venting channel 122.

In such a setup, the filling principle of the refilling device is as follows. When the fluid fuel is a liquid fuel, the fluid fuel is transported and flowed from the fluid channel 121 of the valve body 12 into the storage vessel 4, so that the fluid fuel occupies the storage space inside the storage vessel 4 and squeezes the air and residual gas remaining inside the storage vessel 4 toward an interior of the venting channel 122, allowing the air and residual gas inside the storage vessel 4 to be exported out of the storage vessel along the venting channel 122 to the outside of the storage vessel 4.

It should be noted that, when the fluid fuel is a gas fuel, typically, the density of the gas fuel is greater than that of the air, and the fluid fuel is transported and flowed from the fluid channel 121 of the valve body 12 to the inside of the storage vessel 4, and the fluid fuel sinks down to a bottom of the storage space of the storage vessel 4, with the lower density of air and residual gas being extruded up and out of the storage vessel 4 along the venting channel 122. Preferably, the gas fuel is typically compressed into a liquid state.

It should also be noted that, when the fluid fuel fills the entire storage space of the storage vessel 4, (if the fluid fuel is a gas fuel, the gas fuel is compressed into a liquid state in the storage space), a white gas (i.e., the fluid fuel in an atomized state) is discharged from the venting channel 122, and this phenomenon is generally used for judging whether it is full or not.

Figure 3:
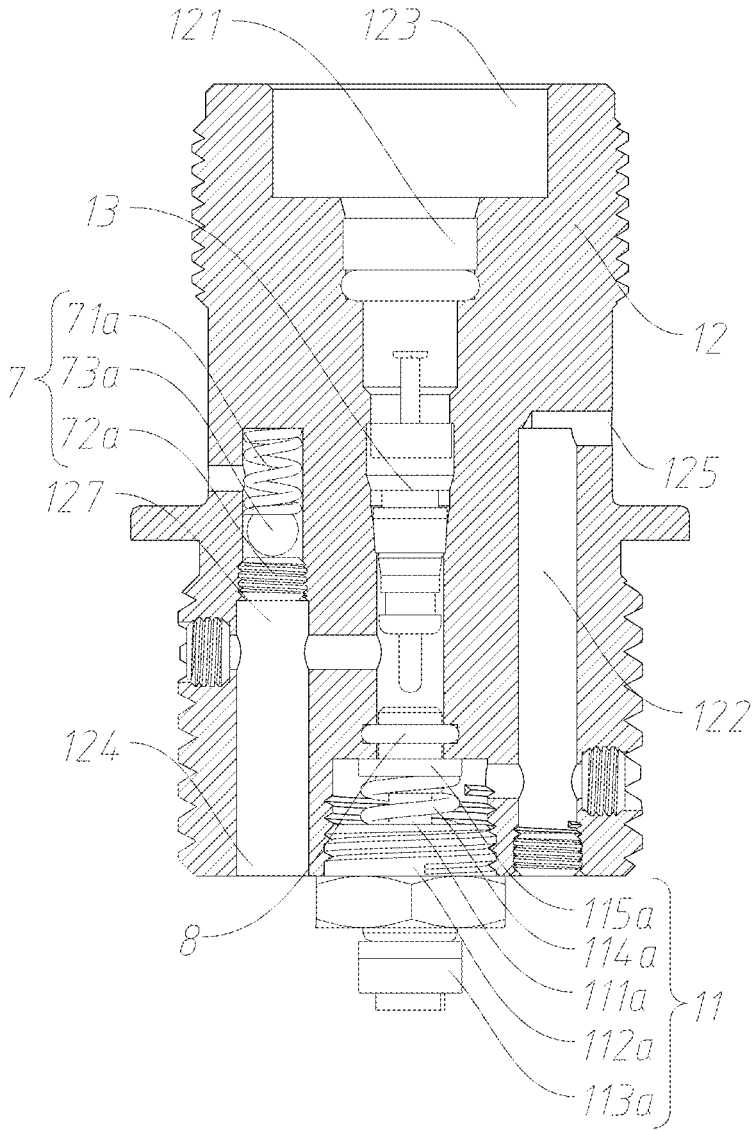
FIG. 3 is a first schematic structural diagram of the multi-position controlled airway valve in Embodiment 1 of the present disclosure.
Figure 4:
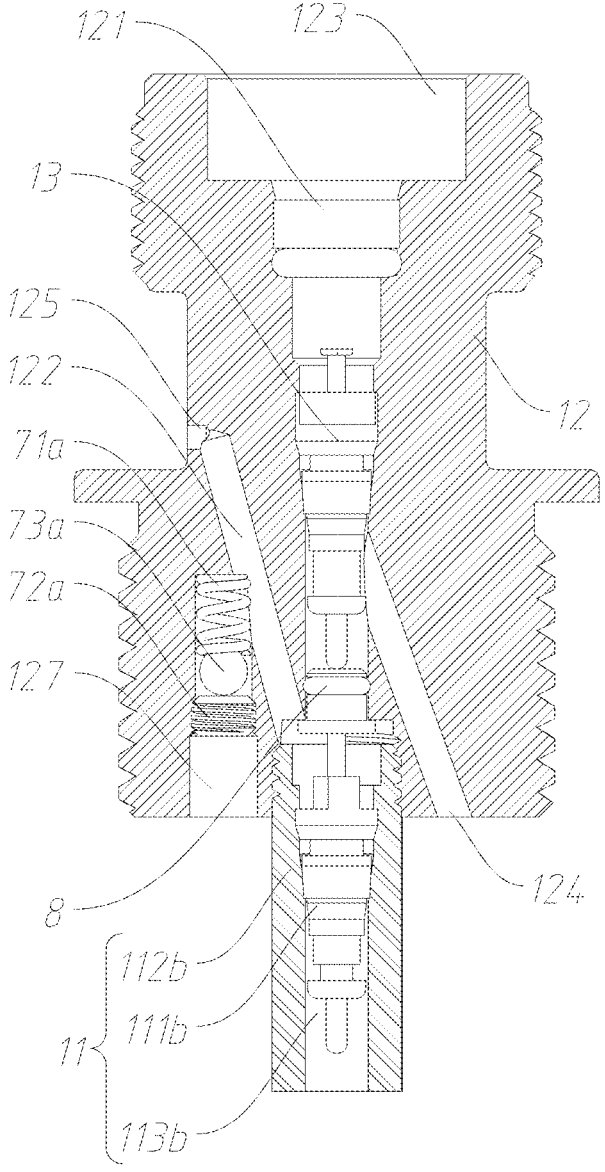
FIG. 4 is a second schematic structural diagram of the multi-position controlled airway valve in Embodiment 1 of the present disclosure.

It should be understood, and as shown specifically in conjunction with FIGS. 3 to 4, that the fluid channel 121 is preferably in communication with the venting channel 122. The venting control member 11 is provided on the venting channel 122. Specifically, the venting control member 11 is fixedly connected to a venting input 126 of the venting channel 122, and a movable end of the venting control member 11 may be inserted into the fluid channel 121, so that the fluid fuel may not flow into the venting channel 122, avoiding air and residual gas from flowing back into the fluid channel 121. To improve the airtightness between the movable end of the venting control member 11 and the fluid channel 121, a sealing ring may also be configured between the movable end of the venting control member 11 and the inner sidewall of the fluid channel 121.

It should be noted that, as shown in FIG. 3, the aforementioned fluid channel 121 includes a fluid main channel, a fluid output tube, and a fluid connection tube. The fluid main channel is in communication with the fluid output tube through the fluid connection tube, the fluid main channel extends in a central axis direction of the valve body 12, and an end of the fluid main channel penetrates the valve body 12 to form a fluid input 123. The fluid input 123 and the venting input 126 are preferably provided on two opposite sides of the valve body 12, respectively, and the fluid input 123 is used to connect to a pressure-reducing valve of the filling spray gun 2 or an energy device (e.g., a coal gas furnace).

Alternatively, besides the aforementioned structure of the fluid channel 121, as shown in FIG. 4, the fluid channel 121 includes a fluid main channel and a fluid output tube, the fluid main channel is in communication with the fluid output tube directly, fluid output tube extends inclined in a central axis direction of the valve body, and the fluid output tube penetrates the valve body 12 to form a fluid output 124. In such a setup, the fluid fuel is sprayed from the filling spray gun 2 to the fluid main channel of the fluid channel 121. At this moment, the fluid fuel sequentially travels along the fluid main channel, the fluid connection tube, the fluid output tube, and is released from the fluid output 124. Since the valve body 12 is fixedly connected to the vessel opening end 41 of the storage vessel 4, the fluid fuel is filled into the storage vessel 4.

It should be understood that an unexpected effect that may be obtained by the inclined setting of the fluid output tube is that the use of fasteners for installation may be reduced, e.g., the first sealing nut on the sidewall of the fluid output tube that seals the first processing opening formed by processing the fluid connection tube. In addition, it is also possible to omit a process procedure, for example, a drilling procedure for processing the fluid connection tube, and a tapping procedure for the first processing opening mentioned above. In such a setup, it is possible to reduce the cost required for accessories and the processing cost, thereby well reducing the production and manufacturing cost of the valve body 12 and the entirety of the refilling device.

It should also be noted that the vent channel 122 optionally extends in a Z-shaped pattern, as shown in FIG. 3. That is, the venting channel 122 includes a venting main channel, a venting output tube, and a venting input tube. The venting input tube is in communication with the venting output tube through the venting main channel, the venting main channel extends in parallel to a central axis direction of the valve body 12, an end of the venting output tube penetrates the valve body 12 to form a venting output 125, and an end of the venting input tube penetrates the valve body 12 to form the venting input 126. When the fluid fuel is filled into the storage vessel 4, the air and residual gas inside the storage vessel 4 flow from the venting input 126 into the venting channel 122, and are discharged from the venting output 125.

Alternatively, besides the venting channel 122 being configured to be extended in a Z-shaped pattern, as shown in FIG. 4, the venting channel 122 may optionally extend inclined in a central axis direction of the valve body 12, so that both ends of the venting channel 122 penetrate the valve body 12 to form a venting output 125 and a venting input 126 respectively, which may also direct the air and residual gas inside the storage vessel 4 to the outside of the storage vessel 4.

It should be understood that an unexpected effect that may be obtained by the inclined setting of the venting channel 122 is that the use of fasteners for installation may be reduced, e.g., the second sealing nut on the sidewall of the venting main channel that seals the second processing opening formed by processing the venting input tube. In addition, it is also possible to omit a process procedure, for example, a tapping procedure for the second processing opening mentioned above. In such a setup, it is possible to reduce the cost required for accessories and the processing cost, thereby further reducing the production and manufacturing cost of the valve body 12 and the entirety of the refilling device.

Figure 2:
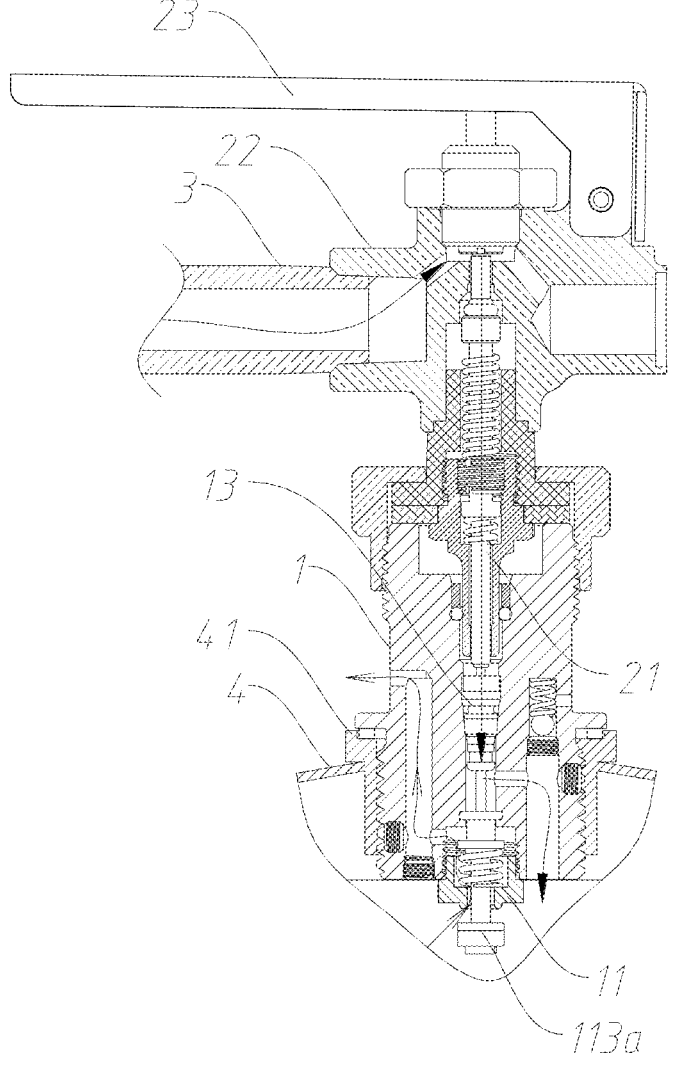
FIG. 2 is a schematic assembly diagram of a refilling system of the present disclosure.
Figure 13:
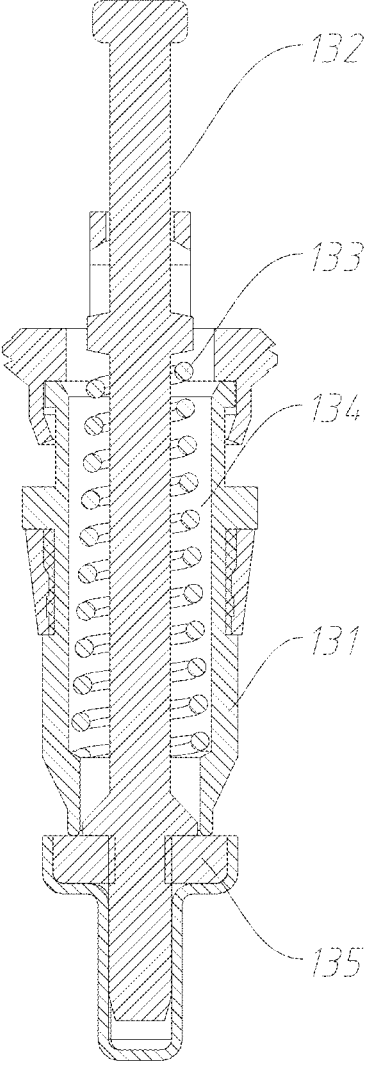
FIG. 13 is a first assembly structural diagram of the valve core assembly of the present disclosure.
Figure 14:
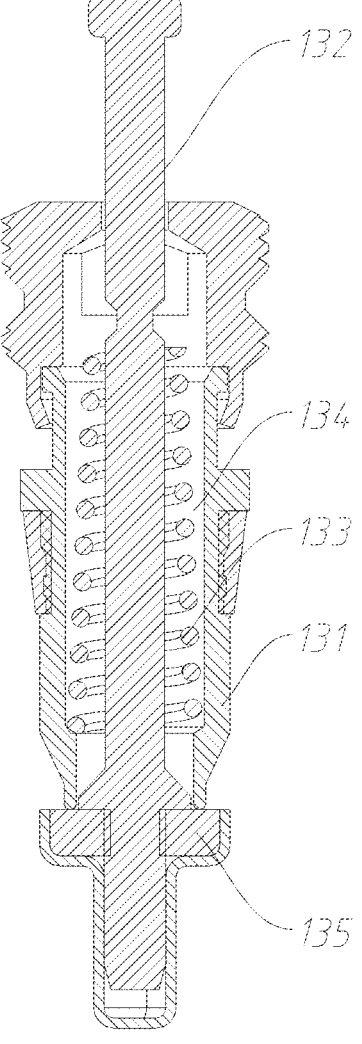
FIG. 14 is a second assembly structural diagram of the valve core assembly of the present disclosure.

Further, please refer to FIGS. 2, 13 and 14 for details. The aforementioned valve core assembly 13 is mounted in the fluid channel 121, in which the valve core assembly 13 includes a valve core piston body 131 and a movable ejector pin 132, the valve core piston body 131 is provided in the fluid channel 121, the valve core piston body 131 is provided with a piston-body internal channel 134 in communication with the fluid channel 121, the movable ejector pin 132 is inserted into the piston-body internal channel 134, and a clearance is configured between the movable ejector pin 132 and a peripheral sidewall of the piston-body internal channel 134. A lower end of the movable ejector pin 132 is provided with a shelter part 135 for sealing an inlet end of the piston-body internal channel 134, and the movable ejector pin 132 moves with respect to the valve core piston body 131 under force, so as to drive the shelter part 135 to move with respect to the inlet end of the piston-body internal channel 134.

In such a setup, the multi-position controlled airway valve 1 of the refilling device is connected to a pressure-reducing valve of an energy device, and please refer to FIGS. 13 and 14 for details. The valve core plunger 5 of the pressure-reducing valve abuts against the movable ejector pin 132 of the valve core assembly 13, so that the shelter part 135 of the movable ejector pin 132 moves away from the inlet end of the piston-body internal channel 134 and drives the fluid channel 121 to be in the connected state. Then, the fluid fuel inside the storage vessel 4 flows through the fluid channel 121 and the piston-body internal channel 134, and is transported to the energy device for supplying the operation of the energy device. That is, the refilling device is in operation.

Preferably, please refer to FIGS. 13 and 14 for details. The movable ejector pin 132 of the valve core assembly 13 is sheathed with an ejector pin elastic member 133, and the ejector pin elastic member 133 is used to reset the movable ejector pin 132. That is, when the movable ejector pin 132 is subjected to a force, the ejector pin elastic member 133 undergoes an elastic deformation, and the ejector pin elastic member 133 is in a compressed state. When the force applied to the movable ejector pin 132 is withdrawn, the ejector pin elastic member 133 deforms to recover and drive the movable ejector pin 132 to reset. Then, the shelter part 135 of the movable ejector pin 132 seals again the inlet end of the piston-body internal channel 134 to drive the fluid channel 121 to be in the sealed state, so that the fluid fuel inside the storage vessel 4 may not leak to the outside of the storage vessel 4.

Generally, a length of the valve core plunger 5 of the existing pressure-reducing valve is less than that of the gun needle plunger 21. When connecting the multi-position controlled airway valve 1 of the refilling device to the filling spray gun 2, the filling spray gun 2 is inserted to the fluid input 123 of the valve body 12, and the gun needle plunger 21 of the filling spray gun 2 abuts against the movable ejector pin 132 of the valve core assembly 13, so that the fluid channel 121 is in the connected state, and the fluid fuel supplied by the filling spray gun 2 may steadily fill to the storage vessel 4. Also, the gun needle plunger 21 of the filling spray gun 2 pushes the movable ejector pin 132 to abut against the movable end of the venting control member 11 to open the venting control member 11, so that the venting channel 122 is in the ventilated state. At this moment, the air and the residual gas inside the storage vessel 4 may be steadily discharged from the storage vessel 4, and the refilling device is in the filling mode.

In other words, the valve core assembly 13 is provided with a first push stroke and a second push stroke, in which the first push stroke is a stroke where the movable ejector pin 132 of the valve core assembly 13 moves to a side proximal to the venting control member 11. At this moment, the movable ejector pin 132 is not in contact with the venting control member 11, and the first push stroke is used to allow the fluid channel 121 to be in the connected state. Therefore, the pressure-reducing valve is inserted to the fluid input 123 of the valve body 12, and the valve core plunger 5 of the pressure-reducing valve drives the movable ejector pin 132 of the valve core assembly 13 to finish the movement of the first push stroke, so that the shelter part 135 of the movable ejector pin 132 moves away from the inlet end of the piston-body internal channel 134, and the fluid channel 121 is in the connected state, which puts the refilling device to be in a use mode.

Additionally, the second push stroke is a stroke where the movable ejector pin moves in an extension direction of the first push stroke to abut against and open the venting control member, and the second push stroke is used to allow the venting channel to be in the ventilated state when the fluid channel is kept to be in the ventilated state. That is, the filling spray gun 2 is inserted to the fluid input 123 of the valve body 12, and the movable ejector pin 132 of the valve core assembly 13 moves along the path of the first push stroke and then exceeds the first push stroke, so that the movable ejector pin 132 abuts and pushes the movable end of the venting control member 11. Then, the shelter part 135 of the movable ejector pin 132 moves away from the inlet end of the piston-body internal channel 134, and the fluid channel 121 is in the connected state. Also, since the venting control member 11 is opened, the venting channel 122 is in the ventilated state, which brings the refilling device to be in the filling mode.

In summary, the valve core assembly 13 may well control the fluid channel 121 of the valve body 12 to be in a free switching between the connected state and the sealed state, i.e., the multi-position controlled airway valve 1 freely switches between the use mode and the closed state according to the disassembling and assembling of the pressure-reducing valve and the valve body 12.

Unexpectedly, the multi-position controlled airway valve 1 may also be connected with different connectors (filling spray gun 2 or pressure-reducing valve) according to the valve body 12 to change the movement stroke of the movable ejector pin 132 in the valve core assembly 13. That is, the movable ejector pin 132 moves only a distance equal to the first push stroke when the multi-position controlled airway valve is in the use mode. At this moment, the venting control member 11 is in closed state so as to ensure that the fluid fuel may not flow out of the storage vessel 4 through the venting control member 11. In the filling mode, the movable ejector pin 132 moves a distance equal to the second push stroke, in which the venting control member 11 and the valve core assembly 13 are cooperated with each other without manual switching, which effectively avoids the problem of omitting the step of discharging the air and the residual gas in the filling mode which leads to the impurity of the fluid fuel stored inside the storage vessel 4, and achieves the purpose of promptly and automatically discharging the air and the residual gas.

As a preferable implementation of the present embodiment, please refer to FIGS. 2, 3, and 4 for details. The aforementioned venting control member 11 includes a movable sealing member and a valve holder assembly, in which an end of the movable sealing member is inserted to a communicating intersection between the fluid channel 121 and the venting channel 122, so as to seal the communicating intersection between the fluid channel 121 and the venting channel 122, and the movable sealing member is reciprocally slidable to fit within the valve holder assembly.

Also, in the filling mode, the movable ejector pin 132 of the valve core assembly 13 abuts against the movable sealing member, so that the valve holder assembly is in communication with the venting channel 122. Specifically, an interior of the valve holder assembly is provided with a valve holder internal channel, the movable sealing member is slidably provided in the valve holder internal channel, and a ventilated clearance is formed between the movable sealing member and the valve holder internal channel. Thus, the ventilated clearance of the valve holder assembly may be in communication with the venting channel 122, so that the air and the residual gas may flow into the venting channel 122 via the ventilated clearance. Further, the valve holder assembly is provided on an end of the venting channel 122 and is detachably connected to the valve body 12.

It should be noted that, in order to ensure that the movable sealing member well seals the communicating intersection between the fluid channel 121 and the venting channel 122, a sealing ring 8 is configured at the communicating intersection between the fluid channel 121 and the venting channel 122, and the movable sealing member is inserted to the sealing ring 8, so as to ensure a tight seal between the movable sealing member and the communicating intersection. It should be understood that, when the movable sealing member is reciprocally sliding, the movable sealing member is kept to move with respect to the sealing ring 8, and the movable sealing member does not separate from the sealing ring 8, so as to avoid the fluid fuel from flowing to the venting channel 122 when the movable sealing member is reciprocally sliding, or avoid the air and the residual gas from flowing back to the fluid channel 121 when the movable sealing member is reciprocally sliding.

As a preferable implementation of the present embodiment, please refer to FIGS. 2 and 3 for details. The aforementioned valve holder assembly includes a venting holder 112a and a venting reset member 114a, a venting valve shaft 111a is inserted into the venting holder 112a, and the venting valve shaft 111a is the movable sealing member of the venting control member 11. That is, the venting holder 112s is provided with a venting internal chamber and a through-hole in communication with the venting internal chamber, the venting internal chamber is in communication with the venting channel 122, and the venting valve shaft 111a penetrates the through-hole and extends into the venting internal chamber, in which a diameter of the venting valve shaft 111a is less than that of the through-hole. Thus, there is a distance between the venting valve shaft 111a and the through-hole, which forms the aforementioned ventilated clearance. In such a setup, the air and residual gas sequentially flow through the ventilated clearance and the venting internal chamber, and flow into the venting channel 122.

Further, the venting valve shaft 111a is provided with a closing part 113a for sealing the through-hole. In the filling mode, when the movable ejector pin 132 of the valve core assembly 13 abuts against the venting valve shaft 111a, the venting valve shaft 111a moves with respect to the venting holder 112a, and the closing part 113a driven by the venting valve shaft 111a moves away from the through-hole, so that the air and residual gas sequentially flow through the ventilated clearance and the venting internal chamber, and flow into the venting channel 122. The venting holder 112a is fixedly connected to an end of the venting channel 122. Preferably, the venting holder 112a is threaded to an end of the venting channel 122, so that the venting control member 11 may be detachably assembled on the valve body 12.

Moreover, please refer to FIG. 2 for details. The aforementioned venting reset member 114a is used to automatically reset the venting valve shaft 111a after the withdrawal of a force. Specifically, the venting reset member 114a is preferably a spring. The venting valve shaft 111a is provided with a reset protrusion 115a, which may be only one and extends along a peripheral direction of the venting valve shaft 111a. Alternatively, there may be a plurality of reset protrusions 115a arranged along a peripheral direction of the venting valve shaft 111a. Both ends of the venting reset member 114a are abutted against the reset protrusion 115a and the venting holder 112a respectively.

In such a setup, when the movable ejector pin 132 of the valve core assembly 13 is abutted against the venting valve shaft 111a, the venting reset member 114a undergoes an elastic deformation and is in a compressed state. When the force of the movable ejector pin 132 of the valve core assembly 13 abutted against the venting valve shaft 111a is withdrawn, the venting reset member 114a deforms to recover and drive the venting valve shaft 111a to reset. Then, the closing part 113a of the venting valve shaft 111a seals the through-hole and closes the venting control member 11 to avoid the fluid fuel from leaking to the outside of the storage vessel 4 through the venting control member 11.

Figure 15:
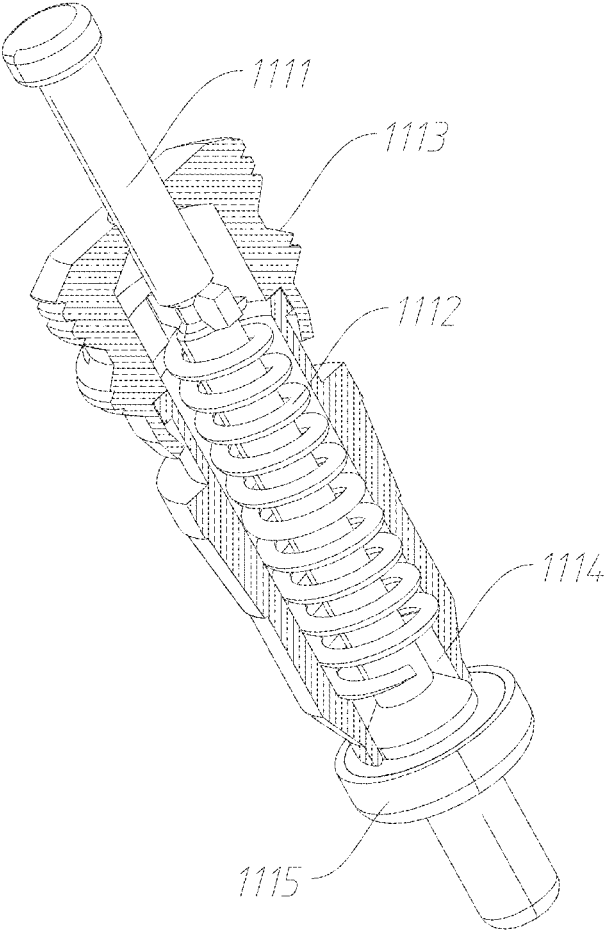
FIG. 15 is a schematic structural diagram of an airtight core of the venting control member of the present disclosure.

As another preferable implementation of the present embodiment, please refer to FIG. 4 and FIG. 15 for details. The aforementioned valve holder assembly includes a venting connecting holder 112b, an airtight core body 1113 inserted within the venting connecting holder 112b, and a core spring reset member 1112 configured within the airtight core body 1113. Specifically, the venting connecting holder 112b is provided with an air guiding channel 113b, and the airtight core body 1113 is fixedly inserted into the air guiding channel. Additionally, the airtight core body 1113 is mounted with a movable core shaft 1111, which is the movable sealing member of the venting control member 11.

Specifically, the movable core shaft 1111, the core spring reset member 1112, and the airtight core body 1113 are assembled to form an airtight core 111b. Airtight core 111b is the sophisticated prior art in the field, which belongs to the standard part available in the field. Thus, only the venting connecting holder 112b is required to be machined for assembling the valve holder assembly, which greatly reduces the difficulty and cost of machining the valve holder assembly. During installation, it is sufficient to only fixedly insert the airtight core into the air guiding channel 113b of the venting connecting holder 112b. Therefore, the precision and difficulty of assembly are also reduced. Also, it facilitates subsequent disassembly and replacement as well as maintenance.

Preferably, please refer to FIG. 15 for details. The airtight core body 1113 is provided with a core-body internal channel 1114 in communication with the air guiding channel 113b, the movable core shaft 1111 extends along a central axis direction of the air guiding channel 113b and is inserted into the core-body internal channel 1114, and there is a clearance between the movable core shaft 1111 and a peripheral sidewall of the core-body internal channel 1114 to be configured as the aforementioned ventilated clearance. Thus, the movable ejector pin 132 of the valve core assembly 13 is abutted against the movable core shaft 1111 of the airtight core 111b, so that the core holder sealing member 1115 on the movable core shaft 1111 moves away from an inlet end of the core-body internal channel 1114. Since the core-body internal channel 1114 or the ventilated clearance is in communication with the air guiding channel 113b, the air and the residual gas inside the storage vessel 4 flow through the air guiding channel 113b and the core-body internal channel 1114 or the ventilated clearance, and are transported to the venting channel 122.

Further, please refer to FIG. 15 for details. A lower end of the movable core shaft 1111 is configured with a core holder sealing member 1115 for sealing an inlet end of the core-body internal channel 1114. When the movable ejector pin 132 of the valve core assembly 13 is abutted against the movable core shaft 1111 of the airtight core 111b, the movable core shaft 1111 is subjected to a force to move with respect to the airtight core body 1113, so as to drive the core holder sealing member 1115 to move away from the inlet end of the core-body internal channel 1114. Then, the air and the residual gas sequentially flow through the air guiding channel 113 and the core-body internal channel 1114 or the ventilated clearance, and flow into the venting channel 122.

Preferably, please refer to FIG. 15 for details. The aforementioned core spring reset member 1112 is sheathed to the movable core shaft 1111, and the core spring reset member 1112 is used to reset the movable core shaft 1111. That is, when the movable core shaft 1111 is subjected to a force, the core spring reset member 1112 undergoes an elastic deformation and is in a compressed state. When the force applied to the movable core shaft 1111 is withdrawn, the core spring reset member 1112 deforms to recover and drive the movable core shaft 1111 to reset, so that the core holder sealing member 1115 of the movable core shaft 1111 seals the inlet end of the core-body internal channel 1114. At this moment, the air guiding channel 113*b* is in a sealed state, and the fluid fuel inside the storage vessel 4 may not leak to the outside.

Figure 5:
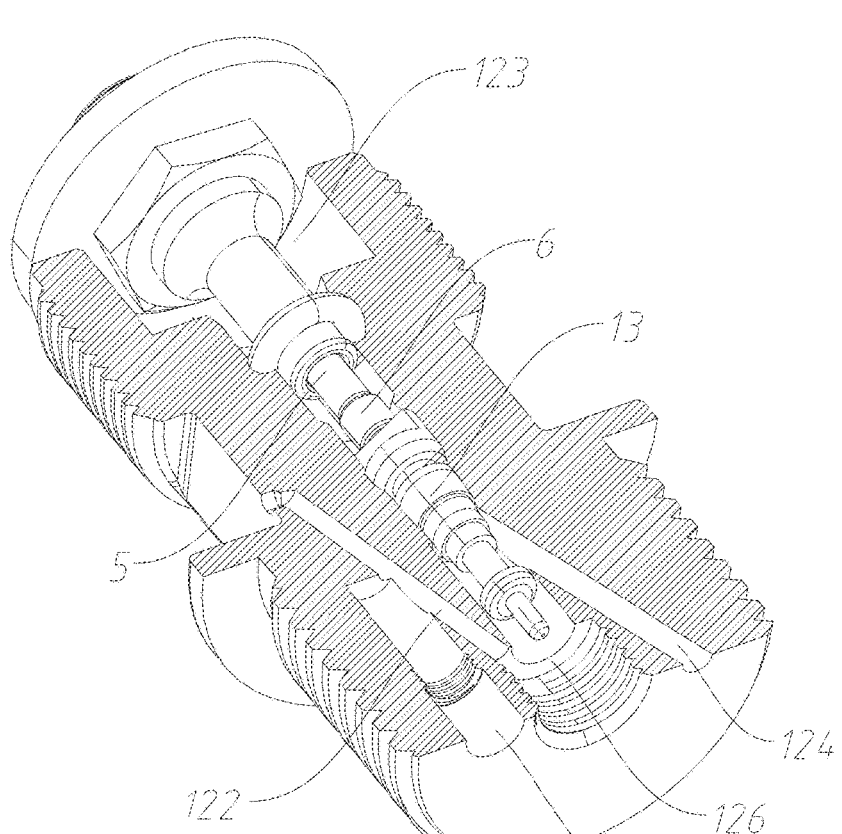
FIG. 5 is a third schematic structural diagram of the multi-position controlled airway valve in Embodiment 2 of the present disclosure.

As a preferable implementation of the present embodiment, please refer to FIGS. 3, 4, and 5 for details. The multi-position controlled airway valve 1 further includes a pressure relief adjusting member 7, the valve body 12 is further provided with a pressure relief channel 127, the pressure relief adjusting member 7 is mounted on the pressure relief channel 127, and the pressure relief adjusting member 7 is used to direct and remove the fluid fuel and heat along the pressure relief channel 127 under high-temperature conditions to ensure that the refilling device promptly removes a part of the fluid fuel inside the storage vessel 4 under high-temperature conditions, thereby reducing the pressure inside the storage vessel 4.

As a further preferable implementation of the present embodiment, please refer to FIG. 3 and FIG. 4 for details. The pressure relief adjusting member 7 includes a heat dissipation reset member 71*a*, a venting fixing holder 72*a* provided with a heat dissipation opening, and a valve member 73*a* for sealing the heat dissipation opening, the heat dissipation reset member 71*a* herein is preferably a spring, the valve member 73*a* is preferably valve ball, a spherical radius of the valve member 73*a* is greater than an inner diameter of the heat dissipation opening and less than a cross-sectional radius of the pressure relief channel 127, both ends of the heat dissipation reset member 71*a* abut against the valve member 73*a* and the valve body 12, and the heat dissipation reset member 71*a*, the venting fixing holder 72*a*, and the valve member 73*a* are all mounted within pressure relief channel 127.

Specifically, an internal sidewall of the pressure relief channel 127 is provided with an internal thread segment, an external sidewall of the venting fixing holder 72*a* is provided with an external thread segment, and the internal thread segment is adapted to the external thread segment, so that the heat dissipation fixing holder may be fixedly threaded within the pressure relief channel 127. After assembling the heat dissipation reset member 71*a*, the venting fixing holder 72*a*, and the valve member 73*a*, the heat dissipation reset member 71*a* is in a compressed state, and the heat dissipation reset member 71*a* also pushes the valve member 73*a* to seal the heat dissipation opening of the venting fixing holder 72*a*. Thus, when the pressure value inside the pressure relief channel 127 is less than or equal to the set pressure value of the heat dissipation reset member 71*a*, i.e., when the pressure value subjected to the valve member 73*a* is less than or equal to the elastic force of the heat dissipation reset member 71*a*, the fluid fuel inside the pressure relief channel 127 may not flow out of the valve body 12 through the heat dissipation opening.

When the pressure value inside the pressure relief channel 127 exceeds the set pressure value of the heat dissipation reset member 71*a*, i.e., when the pressure value subjected to the valve member 73*a* overcomes the elastic force of the heat dissipation reset member 71*a*, the valve member 73*a* moves away from the heat dissipation opening of the venting fixing holder 72*a*, so that the heat dissipation opening is opened, and the fluid fuel flows through the heat dissipation opening and is discharged out of the valve body 12 along the pressure relief channel 127. In such a setup, the pressure relief adjusting member 7 is of simple structure and of easy assembly. Also, it effectively ensures that the refilling device promptly removes a part of the fluid fuel inside the storage vessel 4 out of the storage vessel 4 under high-temperature conditions, which avoids the risk of the storage vessel 4 exploding at high temperatures.

It should be noted that, the pressure relief channel 127 is optionally in communication with the fluid channel 121. In some implementations, as shown in FIG. 3, an extension beyond the fluid connection tube along an extension direction of the fluid output tube is formed into a pressure relief channel 127. Alternatively, in another implementation, the pressure relief channel 127 extends in a direction from a side of the valve body 12 proximal to the venting control member 11 to the fluid output tube. Alternatively, as shown in FIG. 4, the pressure relief channel 127 is in communication with the venting channel 122, the pressure relief channel 127 extends in a direction from a side of the valve body 12 proximal to the venting control member 11 to the venting channel 122 and is in communication with the venting channel 122. In such a setup, it is much easier to process and form the pressure relief channel 127 on the valve body 12, which reduces the processing difficulty and processing cost.

Figure 6:
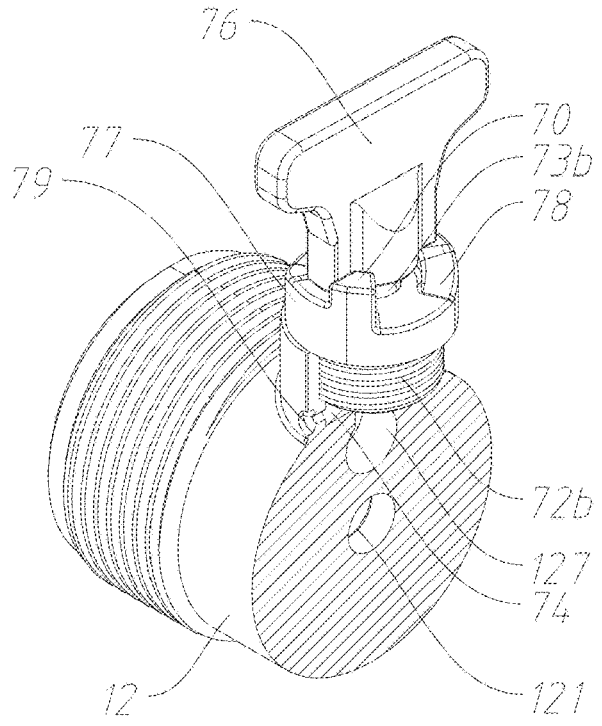
FIG. 6 is a first state assembly diagram of the valve body and the pressure relief adjusting member of the present disclosure.
Figure 7:
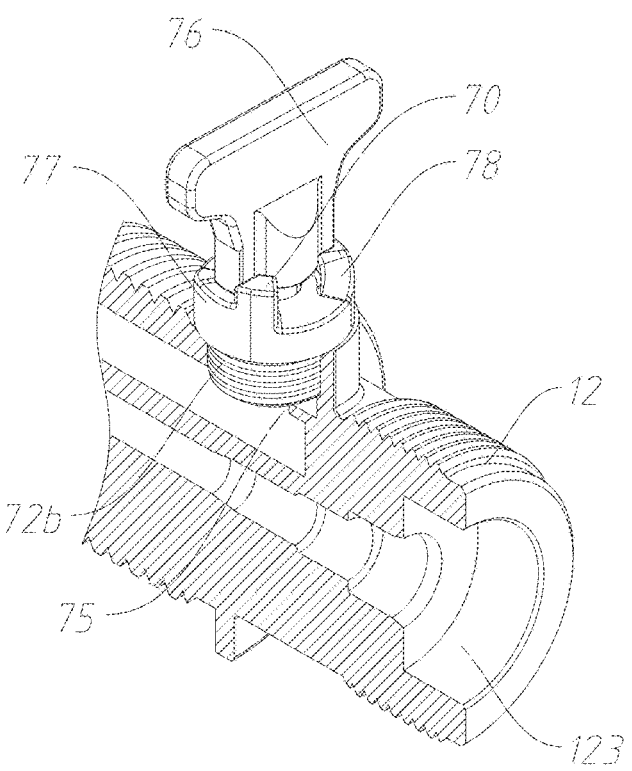
FIG. 7 is a second state assembly diagram of the valve body and the pressure relief adjusting member of the present disclosure.
Figure 8:
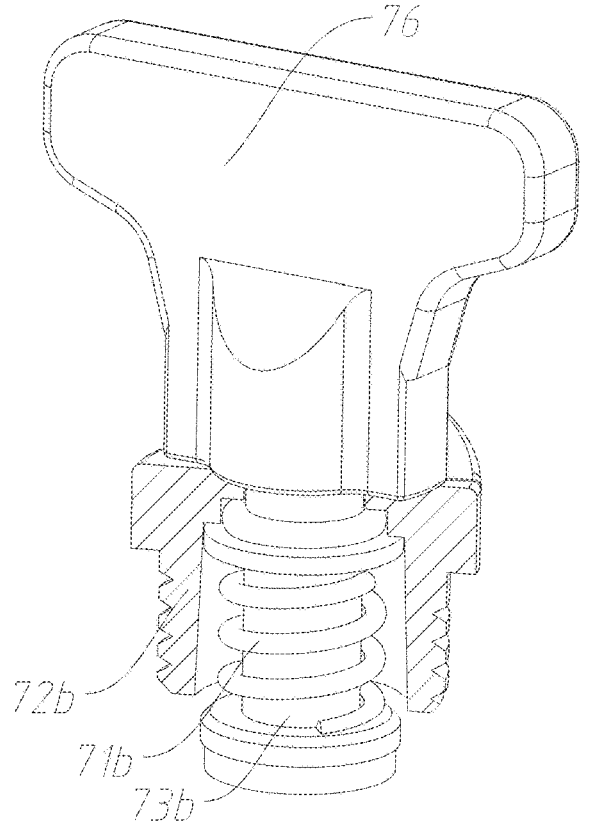
FIG. 8 is a schematic structural diagram of the pressure relief adjusting member of the present disclosure.

Additionally, besides the aforementioned structure of the pressure relief adjusting member 7, disclosed in the present disclosure is also another preferable implementation, referring to FIGS. 6, 7, 8 for details. The pressure relief adjusting member 7 includes a pressure relief reset member 71*b*, a pressure relief valve shaft 73*b*, and a pressure relief connecting holder 72*b*, in which the pressure relief reset member 71*b* is preferably a spring. Both ends of the pressure relief reset member 71*b* are abutted against the pressure relief valve shaft 73*b* and the pressure relief connecting holder 72*b* respectively. Specifically, an end of the pressure relief valve shaft 73*b* proximal to the pressure relief channel 127 is provided with a sealing protrusion, the pressure relief valve shaft 73*b* is inserted in the pressure relief connecting holder 72*b*, an end of the pressure relief reset member 71*b* is abutted against an internal sidewall of the pressure relief connecting holder 72*b*, and an opposite end of the pressure relief reset member 71*b* is abutted against the sealing protrusion.

Further, please refer to FIGS. 6 and 7 for details. An end of the pressure relief channel 127 is provided with a pressure relief chamber 74 in communication with an exterior of the valve body 12. That is, the chamber wall of the pressure relief chamber 74 is provided with pressure relief holes, an interior of the pressure relief chamber 74 is in communication with the exterior of the pressure relief connecting holder 72*b* through the pressure relief holes. The number of pressure relief holes is preferably configured as one, but is not, admittedly, limited to one, and may also be two, three, four, and so on. The pressure relief chamber 74 is further provided with a through-opening 75 in communication with the pressure relief channel 127, the pressure relief connecting holder 72*b* is fixedly connected to the pressure relief chamber 74, in which the fixed connection herein is preferably a threaded connection and may optionally be a snap-fitted connection or a bolt connection. When mounting the pressure relief adjusting member 7 into the pressure relief chamber 74, the pressure relief reset member 71*b* is in a compressed state, and the pressure relief reset member 71*b* pushes the sealing protrusion on the pressure relief valve shaft 73*b* to be abutted against the chamber wall of the pressure relief chamber 74, so as to seal the through-opening 75 of the pressure relief chamber 74.

Additionally, when the pressure value inside the pressure relief channel 127 exceeds the set pressure value of the heat dissipation reset member 71*a*, i.e., when the pressure value subjected to the sealing protrusion of the pressure relief valve shaft 73b overcomes the elastic force of the pressure relief reset member 71b, the sealing protrusion moves away from the through-opening 75 of the pressure relief chamber 74, so that the through-opening 75 is opened, and the pressure relief reset member 71b is further compressed. Thus, the fluid fuel flows through the through-opening 75 to the pressure relief chamber 74, and is finally discharged out of the pressure relief chamber 74 through the pressure relief hole.

When the pressure value inside the pressure relief channel 127 is less than or equal to the set pressure value of the heat dissipation reset member 71a, i.e., when the pressure value subjected to the sealing protrusion of the pressure relief valve shaft 73b is less than or equal to the elastic force of the heat dissipation reset member 71a, the elastic force of the heat dissipation reset member 71a pushes the pressure relief valve shaft 73b to reset, so that the sealing protrusion of the pressure relief valve shaft 73b moves toward the through-opening 75 until the sealing protrusion of the pressure relief valve shaft 73b seals the through-opening 75 of the pressure relief chamber 74.

Further, please refer to FIGS. 6, 7, and 8 for details. The pressure relief valve shaft 73b is provided with a rotatable handle 76. Specifically, the rotatable handle 76 is preferably threaded to the pressure relief valve shaft 73b, the pressure relief connecting holder 72b is provided with a guiding protrusion 77, the guiding protrusion 77 extends along a peripheral side of the pressure relief connecting holder 72b, and the guiding protrusion 77 is configured with a guiding surface 78. As shown in FIG. 6 and FIG. 7, the guiding surface 78 extends helically/inclined towards a side distal to the pressure relief connecting holder 72b and in a central axis direction of the pressure relief valve shaft 73b. The rotatable handle 76 is rotated to allow the rotatable handle 76 to slide in contact with the guiding surface 78 of the guiding protrusion 77. Additionally, the rotatable handle 76 and the pressure relief valve shaft 73b also move in a central axis direction of the rotatable handle 76 under the action of the guiding surface 78 of the guiding protrusion 77.

In such a setup, when the rotatable handle 76 is rotated to the guiding protrusion 77, the pressure relief valve shaft 73b moves in a direction distal to the pressure relief connecting holder 72b, so that the sealing protrusion on the pressure relief valve shaft 73b moves away from the through-opening 75 of the pressure relief chamber 74 so as to open the through-opening 75. When the rotatable handle 76 is rotated reversely away from the guiding protrusion 77, the pressure relief valve shaft 73b moves in a direction proximal to the pressure relief connecting holder 72b, so that the sealing protrusion on the pressure relief valve shaft 73b seals the through-opening 75 of the pressure relief chamber 74. At this moment, the bottom surface of the rotatable handle 76 is abutted against and in contact with the top surface of the pressure relief connecting holder 72b.

It should be noted that the guiding protrusion 77 is provided with an anti-detachment limiting part 70, the anti-detachment limiting part 70 and the guiding surface 78 are positioned on two opposite sides of the guiding protrusion 77. When applying a torque or a force to the rotatable handle 76, it is slid along the guiding surface 78 of the guiding protrusion 77 to a top of the guiding protrusion 77 until the rotatable handle 76 is abutted against the anti-detachment limiting part 70. In such a setup, under the constraining and limiting action of the anti-detachment limiting part 70, the rotatable handle 76 is effectively prevented from detaching from the guiding protrusion 77.

It should also be noted that, besides the structures of the aforementioned preferable pressure relief adjusting member 7, other structures of pressure reducing and regulating elements may also be adopted. For example, a pressure limit valve includes a pressure reducing valve body, a pressure reducing valve mounted in the pressure reducing valve body, a pressure reducing piston, and a valve spring, in which the pressure reducing piston is used to seal the common rail inlet end of the pressure reducing channel in the pressure reducing valve body. When the pressure is too high, the pressure reducing piston moves or deforms along an extension direction of the pressure reducing channel, so that the fluid fuel flows along the extension direction of the pressure reducing channel. When the pressure is decreased to lower than a threshold of the pressure limit valve, the pressure reducing piston moves to reset and deforms to recovery under the action of the valve spring, so as to close the pressure relief adjusting member 7.

Embodiment 2

The multi-position controlled airway valve disclosed in the Embodiment 1 may well automatically switch the use state according to the connectors, which ensure the purity of the fluid fuel stored and used inside the storage vessel 4. Considering the existing steel cylinders that require manual closure of the main valve holder in cases of fire or other high-temperature working conditions, if the main valve holder is not closed promptly, the existing steel cylinders are highly susceptible to intensifying fires when they are still supplying gas to the outside in high-temperature environment.

In view of the aforementioned existing problems, a preferable implementation is disclosed based on the multi-position controlled airway valve 1 disclosed in Embodiment 1, referring to FIG. 5 for details. The multi-position controlled airway valve 1 further includes an over-temperature protection member 6, the over-temperature protection member 6 is provided in the fluid channel 121 of the valve body 12, and the over-temperature protection member 6 deforms when melted or heated. That is, the over-temperature protection member 6 is melted or deforms in a high-temperature working condition, so that the valve core assembly 13 controls the fluid channel 121 to be in a sealed state.

In the present embodiment, please refer to FIG. 5 for details. The multi-position controlled airway valve 1 is in a use mode, the valve core plunger 5 of the pressure reducing valve is inserted to the fluid input 123 of the valve body 12, and the valve core plunger 5 is abutted against the over-temperature protection member 6, so that the over-temperature protection member is abutted against the movable ejector pin 132 of the valve core assembly 13. When the multi-position controlled airway valve is in a filling mode, the gun needle plunger 21 of the filling spray gun 2 is inserted to the fluid input 123 of the valve body 12, the gun needle plunger 21 is abutted against the movable ejector pin of the valve core assembly 13, so that the over-temperature protection member 6 is abutted against the movable ejector pin 132 of the valve core assembly 13 and the movable ejector pin 132 is abutted against the movable end of the venting control member 11.

As shown in FIG. 5, a diameter of the over-temperature protection member is less than an internal diameter of the fluid channel 121 of the valve body 12. Thus, a distance is formed between the over-temperature protection member 6 and the fluid channel 121, so that the fluid fuel is able to flow through the over-temperature protection member 6 and ensure the smooth flow of the fluid fuel. Alternatively, a diameter of the over-temperature protection member 6 is adapted to an internal diameter of the fluid channel 121, and the over-temperature protection member 6 is provided with an opening, so that the fluid fuel is also able to flow through the over-temperature protection member 6.

In such a setup, utilizing the thickness of the over-temperature protection member 6 is equivalent to increasing the length of the valve core plunger 5, thereby increasing the push stroke of the movable ejector pin 132, which may well ensure the fluid channel 121 is in a fully connected state, further improving the stability and smoothness of the fluid fuel flow through the fluid channel 121. Additionally, utilizing the thickness of the over-temperature protection member 6 is equivalent to increasing the length of the gun needle plunger 21, which not only ensures that the movable ejector pin 132 of the valve core assembly 13 may stably act on the movable end of the venting control member 11, but also increases the push stroke of the movable end of the venting control member 11, thereby ensuring that the movable end of the venting control member 11 achieves full travel. Furthermore, it may well ensure that the venting control member 11 is opened deeper, and the venting channel 122 is in a fully ventilated state, which further improves the stability of the fluid fuel flow through the fluid channel 121, and also improves the efficiency of the air and the residual gas discharging out of the multi-position controlled airway valve 1.

Further, when the multi-position controlled airway valve 1 is under fire or high-temperature working conditions, the valve body 12 and the valve core assembly 13 will absorb a large amount of heat and have a relatively high temperature. Also, the fluid fuel flowing through the fluid channel 121 also has a relatively high temperature. At this moment, the over-temperature protection member 6 made of a low melting point material, melts when exposed to heat. The material used for the over-temperature protection member 6 herein is optionally polyethylene, polypropylene, polyamide, polycarbonate, polyformaldehyde, polyphenylene ether, thermoplastic polyester, polytetrafluoroethylene, polyvinylidene fluoride, polyimide, polyphenylene sulfide, polysulfone plastics, polysulfone plastics, polyketone plastics, polyarylate, polyvinyl chloride, polystyrene, acrylonitrile-butadiene-styrene copolymer or a material formed by cross-linking of two or more of the above materials or a mixture of two or more of the above materials.

In such a setup, when the multi-position controlled airway valve 1 is under fire or high-temperature working conditions, the temperature subjected to the over-temperature protection member 6 is higher than the melting point of the material of the over-temperature protection member 6, so that the over-temperature protection member 6 melts or deforms from heat, and the movable ejector pin 132 of the valve core assembly 13 being subjected to the gun needle plunger 21 or valve core plunger 5 by the over-temperature protection member 6 would fail. At this moment, the movable end of the venting control member 11 moves to be reset, and the fluid channel 121 is switched again to be in the sealed state, which automatically cuts off the fluid fuel flowing in the fluid channel 121, thereby preventing the risk of occurrence and intensifying of the fire.

As a preferable implementation of the present embodiment, referring to FIG. 5 for details, the over-temperature protection member 6 is sheathed to an end of the movable ejector pin 132 of the valve core assembly 13. Specifically, an interior of the over-temperature protection member 6 is provided with a fixing chamber, the fixing chamber of the over-temperature protection member 6 is sheathed to an end of the movable ejector pin 132, so as to ensure that the over-temperature protection member 6 is stably mounted on the valve core assembly 13, which effectively achieves that the gun needle plunger 21 or valve core plunger 5 may transfer the force to the movable ejector pin 132 of the valve core assembly 13 more stably. thereby preventing the misalignment of the over-temperature protection member 6 during transmission.

It should be noted that, the multi-position controlled airway valve 1 disclosed in Embodiment 2 is also adapted to be applied to the refilling device and the refilling system.

Embodiment 3

The multi-position controlled airway valves disclosed in Embodiment 1 and Embodiment 2 are all well able to automatically switch the use state according to the connectors, so as to ensure the purity of the fluid fuel stored and used in the storage vessel. Considering that it is necessary to select a specific connector during use of the multi-position controlled airway valve 1 to achieve double stroke adjustment, in such a setup, the use may be limited by the parts of the connector. In view of this problem, disclosed in the present embodiment is further a preferable implementation. It should be noted herein that, the present embodiment differs from the Embodiment 1 and Embodiment 2 only in that:

Referring to FIGS. 9-12 for details, the multi-position controlled airway valve 1 further includes a multi-position switch 9, the multi-position switch 9 is mounted on the valve body 12. The mount herein may optionally be a threaded connection, or may be a welded connection, or other connection methods between the valve body and the connector in the field.

As a core solution of the present embodiment, the multi-position switch 9 has a first position mode, a second position mode and a third position mode, and the switch plunger member 91 of the multi-position switch 9 is separated from the valve core assembly 13 in the first position mode. Then, the movable ejector pin 132 of the valve core assembly 13 may seal the inlet end of the piston-body internal channel 134 without being subjected to a force, which drives the fluid channel 121 to be in the sealed state. Separation herein should be understood to include both ways in which there is clearance between the switch plunger member 91 and the valve core assembly 13, and ways in which the switch plunger member 91 and the valve core assembly 13 are in contact with each other with no interacting forces.

In the second position mode, the switch plunger member 91 of the multi-position switch 9 is abutted against the valve core assembly 13. Specifically, the switch plunger member 91 of the multi-position switch 9 is abutted against the movable ejector pin 132 of the valve core assembly 13, so that the shelter part 135 of the movable ejector pin 132 moves away from the inlet end of the piston-body internal channel 134, so as to drive the fluid channel 121 to be in the connected state. Then, the fluid fuel inside the storage vessel 4 flows through the fluid channel 121 and the piston-body internal channel 134, and is transported to an energy device to supply the energy device for use.

In the third position mode, the switch plunger member 9 of the multi-position switch 9 is abutted against the valve core assembly 13. While the switch plunger member 91 of the multi-position switch 9 is abutted against the movable ejector pin 132 of the valve core assembly 13, it also pushes the movable ejector pin 132 to be abutted against the movable end of the venting control member 11 to open the venting control member 11, allowing the venting channel 122 to be in the ventilated state, which achieves that the venting channel 122 is allowed to be in the ventilated state when keeping the fluid channel 121 to be in the connected state. At this moment, the air and the residual gas inside the storage vessel 4 may be steadily discharged out of the storage vessel 4, and the refilling device is in the filling mode.

The working principle of the multi-position switch 9 is as follows. The switch plunger member 91 of the multi-position switch 9 in the first position mode is defined to be in the initial position. Then, the switch plunger member 91 of the multi-position switch 9 in the second position mode is formed with a first push stroke. At this moment, the switch plunger member 91 acts on the movable ejector pin 132 of the valve core assembly 13 and drives the movable ejector pin 132 to move a distance equal to the first push stroke. The switch plunger member 91 of the multi-position switch 9 in the third position mode is formed with a second push stroke. At this moment, the movable ejector pin 132 of the valve core assembly 13 is pushed by the switch plunger member 91 and moves along the extension direction of the first push stroke, which is also abutted against the venting control member 11 and opens it. That is, the movable ejector pin 132 acted by the switch plunger member 91 moves a distance equal to the second push stroke.

In summary, the multi-position switch 9 is adopted to replace the connection between the different connectors and the valve body 12, avoiding the problem of replacing different corresponding connectors of the multi-position controlled airway valve 1 when in use, and also avoiding the problem of frequent disassembly and assembly of the connectors and the valve body 12, which may lead to the loosening and leakage. When in use, it is only necessary to insert the external air guiding tube to the multi-position switch 9, which improves the convenience and efficiency of using the multi-position controlled airway valve 1. Unexpectedly is that an easy switching of the multi-position switch 9 accomplishes the purpose of switching between the first push stroke and the second push stroke of the valve core assembly 13, achieving the effect of an easier switching mode of the multi-position controlled airway valve 1.

As a preferable implementation of the present embodiment, referring to FIGS. 9-12 for details. The multi-position switch 9 includes a switch toggle member 92 and a switch connecting holder 93, and the switch connecting holder 93 is provided with a switch air-guide chamber 94 in communication with the fluid channel 121. When the switch connecting holder 93 is mounted to the valve body 12, the switch air-guide chamber 94 is in communication with the fluid channel 121 of the valve body 12, so that the fluid fuel may steadily flow between the switch air-guide chamber 94 and the valve body 12. Additionally, the switch connecting holder 93 is provided with a switch external opening 95 for connecting the air guiding tube, and the switch external opening 95 is in communication with the switch air-guide chamber 94. In such a setup, the fluid fuel may flow from the air guiding tube into the switch air-guide chamber 94, so as to be supplied into the storage vessel 4. Alternatively, the fluid fuel may flow from the switch air-guide chamber 94 to the air guiding tube, so as to be supplied to an energy device for operation.

Further, referring to FIGS. 9-12 for details, the switch toggle member 92 is hinged to the switch plunger member 91, and the switch plunger member 91 is slidably provided in the switch air-guide chamber 94, in which the hinge point between the switch toggle member 92 and the switch plunger member 91 is not at the rotation center of the switch toggle member 92. That is, utilizing the principle of eccentric motion, when toggling/rotating the switch toggle member 92, the switch plunger member 91 is driven to slide in the switch air-guide chamber 94, so that the switch plunger member 91 moves inside the switch air-guide chamber 94 with different travels.

Figure 9:
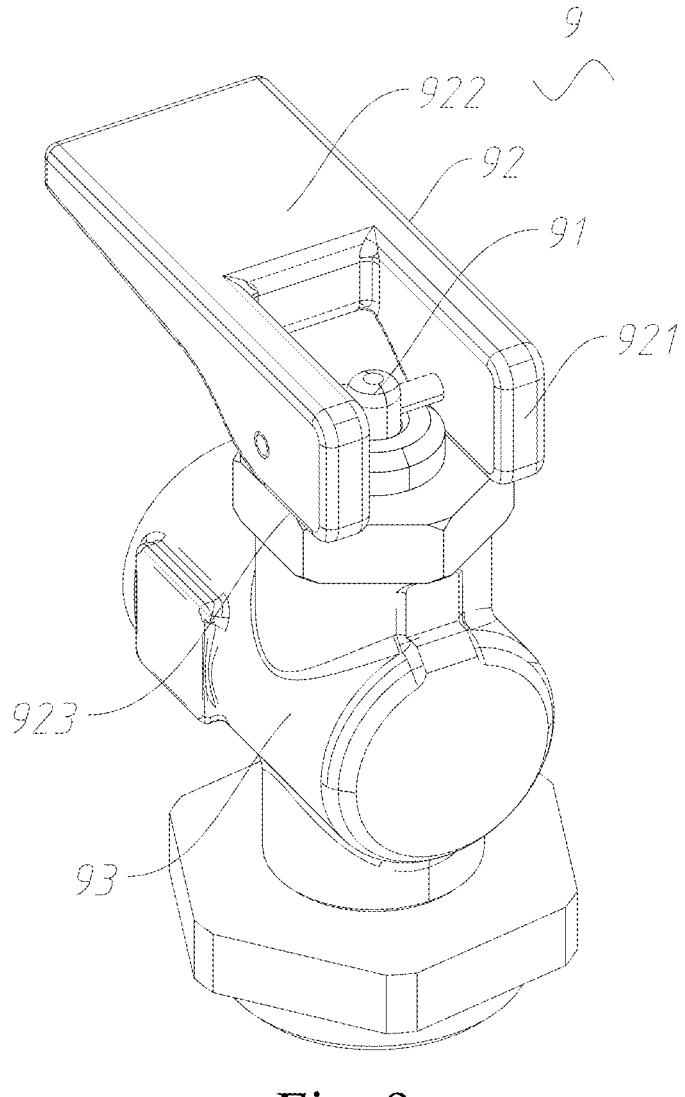
FIG. 9 is a schematic structural diagram of the multi-position switch of the present disclosure.
Figure 10:
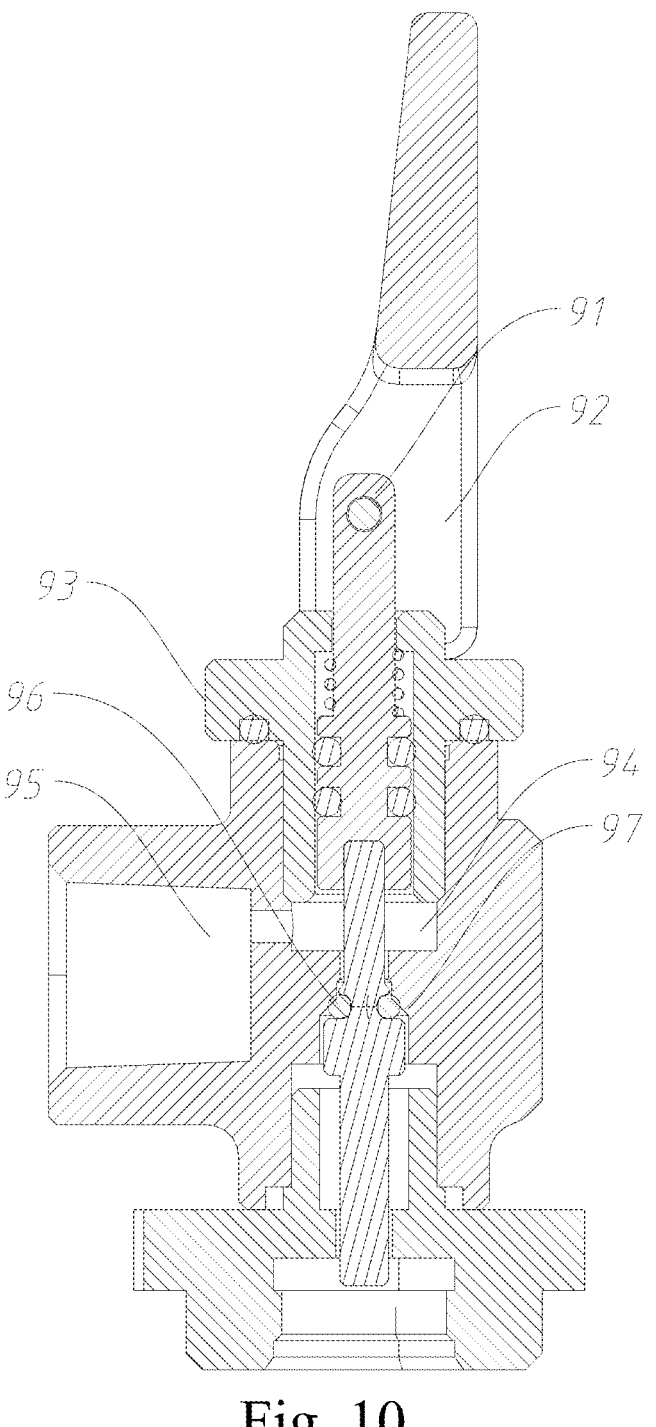
FIG. 10 is a first state schematic diagram of the multi-position switch of the present disclosure.

As a further preferable implementation of the present embodiment, referring to FIG. 9, the aforementioned switch toggle member 92 is configured with a first action contact end 921, a second action contact end 922, and a third action contact end 923, in which the first action contact end 921 is one side of the switch toggle member 92 distal to the hinge point. As shown in FIG. 10, the switch toggle member 92 is switched to the first action contact end 921, i.e., the first action contact end 921 of the switch toggle member 92 is abutted against the switch connecting holder 93, and the switch plunger member 91 of the multi-position switch 9 is pulled by the switch toggle member 92 to be separated from the valve core assembly 13. At this moment, the multi-position switch 9 is in the first position mode.

Figure 11:
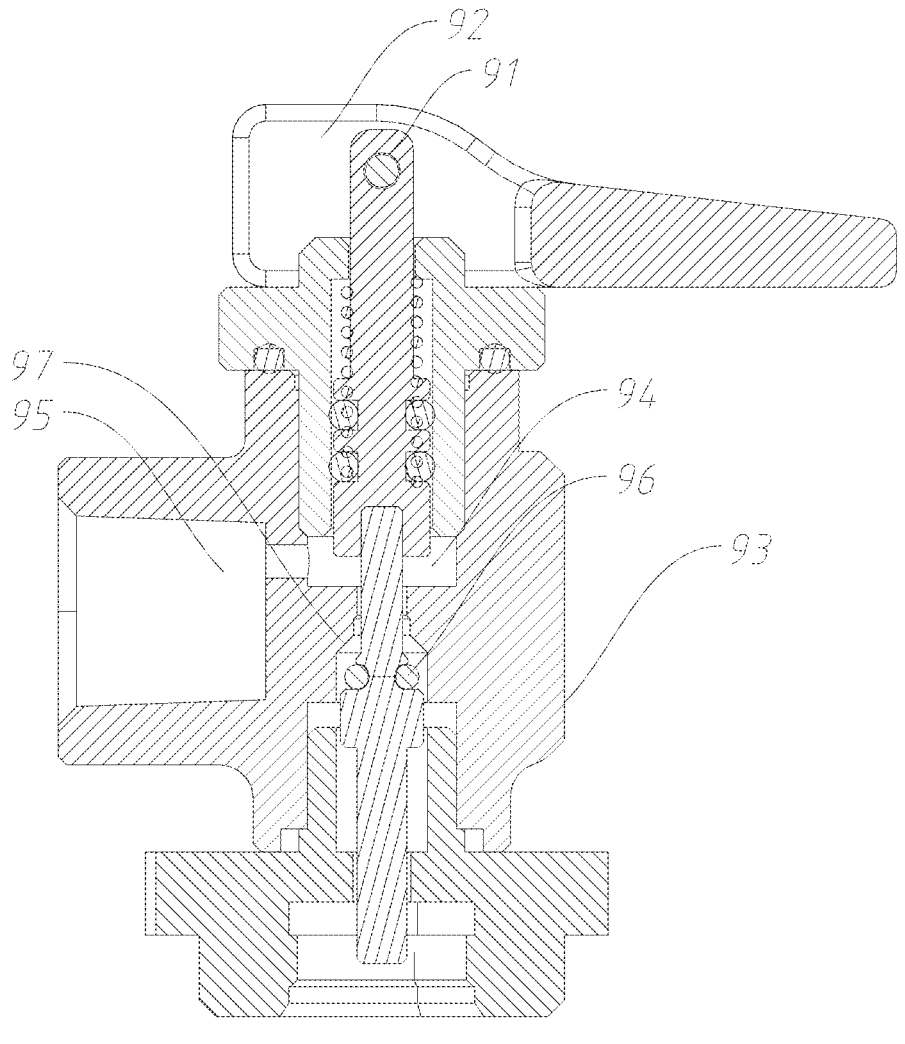
FIG. 11 is a second state schematic diagram of the multi-position switch of the present disclosure.

As shown in FIG. 9, the third action contact end 923 is one side of the switch toggle member 92 proximal to the hinge point. As shown in FIG. 11, the switch toggle member 92 is switched to the third action contact end 923, i.e., the third action contact end 923 of the switch toggle member 92 is abutted against the switch connecting holder 93, so that the switch plunger member 91 of the multi-position switch 9 is inserted into a deepest position inside the switch air-guide chamber 94. The movement of the second push stroke is accomplished, so as to ensure that the movable ejector pin 132 of the valve core assembly 13 may move along the extension direction of the first push stroke and be abutted against and open the venting control member 11. At this moment, the multi-position switch 9 is in the third position mode.

Figure 12:
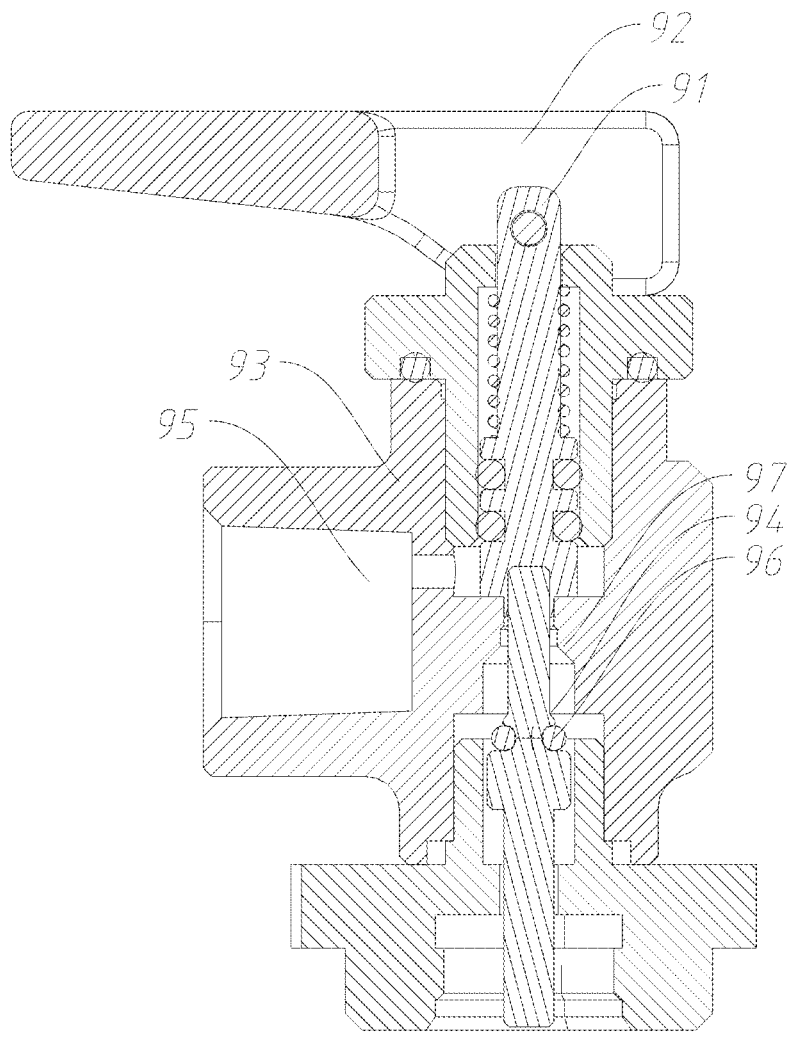
FIG. 12 is a third state schematic diagram of the multi-position switch of the present disclosure.

As shown in FIG. 9, the second action contact end 922 is one side of the switch toggle member 92 between the furthest and closest distances, i.e., a distance between the second action contact end 922 and the hinge point is less than that between the first action contact end 921 and the hinge point, and a distance between the second action contact end 922 and the hinge point is greater than that between the third action contact end 923 and the hinge point. As shown in FIG. 12, the switch toggle member 92 is switched to the second action contact end 922, i.e., the second action contact end 922 of the switch toggle member 92 is abutted against the switch connecting holder 93, so that the switch plunger member 91 of the multi-position switch accomplishes the movement of the first push stroke. At this moment, the movable ejector pin 132 of the valve core assembly 13 acted by the switch plunger member 91 moves only a distance equal to the first push stroke. At this moment, the multi-position switch 9 is in the second position mode.

As a preferable implementation of the present embodiment, referring to FIGS. 10, 11, and 12 for details, the switch plunger member 91 is configured with a switch sealing member 96, the switch air-guide chamber 94 is formed with a sealing part 97, and the sealing part 97 is fitted with the switch sealing member 96, so as to allow the switch air-guide chamber 94 to be in the sealed state. Specifically, when the switch toggle member 92 is switched to the first action contact end 921, the switch sealing member 96 is driven by the switch plunger member 91 to be abutted against the sealing part 97. In such a setup, accompanying with the sealing state of the valve core assembly 13, a double sealed effect may be achieved, which effectively increases the sealing of the multi-position controlled airway valve 1. When the switch toggle member 92 is switched to the second action contact end 922 or the third action contact end 923, the switch sealing member 96 is driven by the switch plunger member 91 to be separated from the sealing part 97, so as to unseal the switch air-guide chamber 94 and ensure smooth flow of the fluid fuel.

The technical means disclosed in the solution of the present disclosure are not limited to those disclosed in the embodiments mentioned above but also include technical solutions consisting of any combination of the above technical features. It should be noted that for those skilled in the art, a plurality of improvements and modifications may be made without departing from the principles of the present disclosure. These improvements and modifications are also considered to be within the scope of protection of the present disclosure.

The invention claimed is:

1. A multi-position controlled airway valve, comprising:
a venting control member;
a valve body, provided with a fluid channel and a venting channel, wherein the venting control member is provided on the venting channel;
a valve core assembly, mounted in the fluid channel, controlling the fluid channel to switch between a connected state and a sealed state, wherein the valve core assembly in a filling mode controls the fluid channel to be in the connected state and abuts against and opens the venting control member so as to keep the venting channel to be in a ventilated state.

2. The multi-position controlled airway valve according to claim 1, wherein the valve core assembly is provided with a first push stroke and a second push stroke, the first push stroke is a stroke where a movable ejector pin of the valve core assembly moves to a side proximal to the venting control member, the first push stroke is used to allow the fluid channel to be in the connected state,
the second push stroke is a stroke where the movable ejector pin moves in an extension direction of the first push stroke to abut against and open the venting control member, and the second push stroke is used to allow the venting channel to be in the ventilated state when the fluid channel is kept to be in the ventilated state.

3. The multi-position controlled airway valve according to claim 1, wherein the venting control member comprises a movable sealing member and a valve holder assembly, the movable sealing member is reciprocally slidable to fit within the valve holder assembly, the valve core assembly abuts against the movable sealing member in the filling mode to communicate the valve holder assembly with the venting channel, and the valve holder assembly is provided on an end of the venting channel and detachably connected to the valve body.

4. The multi-position controlled airway valve according to claim 3, wherein the valve holder assembly comprises a venting holder and a venting reset member, a venting valve shaft is inserted in the venting holder, the venting valve shaft is the movable sealing member, the venting holder is fixedly connected to an end of the venting channel, and the venting reset member is used to automatically reset the venting valve shaft after withdrawal of a force.

5. The multi-position controlled airway valve according to claim 3, wherein the valve holder assembly comprises a venting connecting holder, an airtight core body inserted within the venting connecting holder, a core spring reset member configured within the airtight core body, the airtight core body is mounted with a movable core shaft, the movable core shaft is the movable sealing member, the core spring reset member is sheathed to the movable core shaft so that the movable core shaft automatically resets after withdrawal of a force.

6. The multi-position controlled airway valve according to claim 3, wherein a communicating intersection between the fluid channel and the venting channel is configured with a seal ring, and the movable sealing member is inserted in the seal ring.

7. The multi-position controlled airway valve according to claim 1, further comprising a multi-position switch mounted on the valve body, and the multi-position switch is provided with a first position mode, a second position mode, and a third position mode,
wherein, in the first position mode, a switch plunger member of the multi-position switch is separated from the valve core assembly, and the fluid channel is in the sealed state,
wherein, in the second position mode, the switch plunger member of the multi-position switch abuts against the valve core assembly to allow the fluid channel to be in the connected state,
wherein, in the third position mode, the switch plunger member of the multi-position switch abuts against the valve core assembly to allow the venting channel to be in the ventilated state and keep the fluid channel to be in the ventilated state.

8. The multi-position controlled airway valve according to claim 7, wherein the multi-position switch comprises a switch toggle member and a switch connecting holder, the switch connecting holder is provided with a switch air-guide chamber in communication with the fluid channel, the switch toggle member is hinged to the switch plunger member, and the switch plunger member is slidably provided in the switch air-guide chamber.

9. The multi-position controlled airway valve according to claim 8, wherein the switch toggle member is configured with a first action contact end, a second action contact end, and a third action contact end;
the multi-position switch is in the first position mode when the switch toggle member moves and is switched to the first action contact end; or
the multi-position switch is in the second position mode when the switch toggle member moves and is switched to the second action contact end; or
the multi-position switch is in the third position mode when the switch toggle member moves and is switched to the third action contact end.

10. The multi-position controlled airway valve according to claim 1, further comprising an over-temperature protection member provided in the fluid channel, and the valve core assembly controls the fluid channel to be in the sealed state when the over-temperature protection member is melted or thermally deformed.

11. The multi-position controlled airway valve according to claim 10, wherein the over-temperature protection member is sheathed to an end of a movable ejector pin of the valve core assembly.

12. The multi-position controlled airway valve according to claim 1, further comprising a pressure relief adjusting member mounted on a pressure relief channel provided on the valve body.

13. The multi-position controlled airway valve according to claim 12, wherein the pressure relief adjusting member comprises a heat dissipation reset member, a venting fixing holder provided with a heat dissipation opening, and a valve member for sealing the heat dissipation opening, both ends of the heat dissipation reset member abut against the valve member and the valve body, and the heat dissipation reset member, the venting fixing holder, and the valve member are all mounted within the pressure relief channel.

14. The multi-position controlled airway valve according to claim 12, wherein the pressure relief adjusting member comprises a pressure relief reset member, a pressure relief valve shaft, and a pressure relief connecting holder, both ends of the pressure relief reset member abut against the pressure relief valve shaft and the pressure relief connecting holder respectively, an end of the pressure relief channel is provided with a pressure relief chamber in communication with an exterior of the valve body, the pressure relief chamber is provided with a through-opening in communication with the pressure relief channel, the pressure relief connecting holder is fixedly connected to the pressure relief chamber, and the pressure relief reset member is used to reset the pressure relief valve shaft to seal the through-opening.

15. The multi-position controlled airway valve according to claim 14, wherein the pressure relief valve shaft is provided with a rotatable handle, the pressure relief connecting holder is provided with a guiding protrusion, and the rotatable handle is rotated to allow the rotatable handle to slide in contact with a guiding surface of the guiding protrusion and also move in a central axis direction of itself.

16. The multi-position controlled airway valve according to claim 14, wherein the pressure relief channel is in communication with the fluid channel, or the pressure relief channel is in communication with the venting channel.

17. The multi-position controlled airway valve according to claim 1, wherein the fluid channel comprises a fluid main channel, a fluid output tube, and a fluid connection tube;

the fluid main channel is in communication with the fluid output tube through the fluid connection tube, and the fluid main channel extends in a central axis direction of the valve body; and/or the fluid main channel is in communication with the fluid output tube directly, and fluid output tube extends inclined in a central axis direction of the valve body.

18. The multi-position controlled airway valve according to claim 1, wherein the venting channel comprises a venting main channel, a venting output tube, and a venting input tube;

24 the venting input tube is in communication with the venting output tube through the venting main channel, and the venting main channel extends in parallel to a central axis direction of the valve body; and/or the venting channel extends inclined in a central axis direction of the valve body.

19. A refilling device, comprising:
a multi-position controlled airway valve; and
a storage vessel, the multi-position controlled airway valve being fixedly connected to the storage vessel,
wherein the multi-position controlled airway valve comprises:
a venting control member;
a valve body, provided with a fluid channel and a venting channel, wherein the venting control member is provided on the venting channel;
a valve core assembly, mounted in the fluid channel, controlling the fluid channel to switch between a connected state and a sealed state, wherein the valve core assembly in a filling mode controls the fluid channel to be in the connected state and abuts against and opens the venting control member so as to keep the venting channel to be in a ventilated state.

20. A refilling system, comprising a refilling device, wherein the refilling device comprises:
a multi-position controlled airway valve; and
a storage vessel, the multi-position controlled airway valve being fixedly connected to the storage vessel,
wherein the multi-position controlled airway valve comprises:
a venting control member;
a valve body, provided with a fluid channel and a venting channel, wherein the venting control member is provided on the venting channel;
a valve core assembly, mounted in the fluid channel, controlling the fluid channel to switch between a connected state and a sealed state, wherein the valve core assembly in a filling mode controls the fluid channel to be in the connected state and abuts against and opens the venting control member so as to keep the venting channel to be in a ventilated state.

* * * * *